United States Patent Office 3,284,413
Patented Nov. 8, 1966

3,284,413
PREPOLYMER ISOCYANURATE RESINS
Herbert L. Heiss, New Martinsville, W. Va., assignor to Mobay Chemical Company, Pittsburgh, Pa., a corporation of Delaware
No Drawing. Filed Dec. 16, 1964, Ser. No. 418,879
3 Claims. (Cl. 260—77.5)

This application is a continuation-in-part of copending application Serial No. 4,214, filed January 25, 1960, now abandoned.

This invention relates to new elastomeric polymeric plastic products and a method for preparing such products and more particularly to plastic products containing isocyanurate rings.

Compounds containing isocyanurate groups,

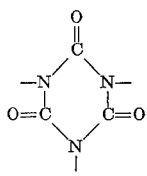

wherein the free valence is through the nitrogen atoms to an organic radical, are to be distinguished from compounds containing cyanurate groups

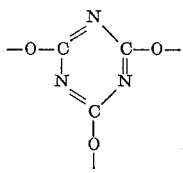

wherein the free valence is through a free oxygen atom to an organic radical.

It is known that isocyanurate rings are formed by trimerization of compounds containing the isocyanate group. The isocyanurate rings will be formed at room temperature in the presence of certain catalysts and the addition of heat will accelerate this reaction. It has been heretofore known to prepair the trimer of organic polyisocyanate compounds and then further react these compounds with an organic compound containing active hydrogen containing groups to prepare resinous materials. However, because of the presence of three isocyanate groups in the molecule, the products formed by reacting the trimer with the active hydrogen compounds are greatly cross-linked and therefore are hard brittle products.

It is therefore an object of this invention to prepare more linear plastic products which include the isocyanurate group within the molecule. It is another object of this invention to provide isocyanurate resins having a higher molecular weight per branch point. It is another object to provide a method of making isocyanurate resins. It is another object of this invention to prepare compounds containing isocyanurate groups which form storage stable intermediates for the preparation of desired end products. It is a further object of this invention to prepare rubber-like elastomeric plastics containing isocyanurate rings. It is still another object to prepare plastic products which exhibit improved tear strength. It is a still further object of this invention to provide compositions containing isocyanurate groups which are resistant to high temperatures.

The foregoing objects and others which will become apparent from the following description are accomplished in accordance with the invention, generally speaking, by providing a method of preparing compositions having a higher molecular weight per branch point by trimerizing an organic compound containing at least two isocyanate groups with an organic monoisocyanate in the presence of a catalyst to form a composition having at least one isocyanurate ring.

The structure of the plastic products formed at each of the isocyanurate rings (i.e. each of the branch points) by the method of this invention will be that of one of the following formulas:

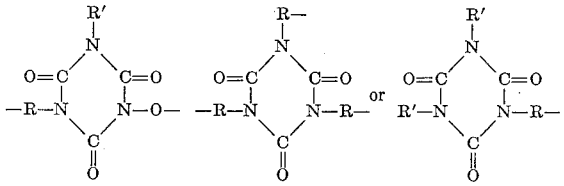

where R is an organic divalent radical and R' is an organic monovalent radical. From these formulas it can be seen that if the ring has the structure of the first formula, linear chain lengthening results. If a ring has the structure of the second formula, a branch point results which is then available for cross-linking. From the third formula it can be seen that chain termination results because of the two monovalent radicals attached to the nitrogen atoms of the ring. The preponderance of any of the groups represented by the formulas and thus the resulting structure of the final product can be substantially controlled by controlling the ratio of the quantity of the monoisocyanate to the quantity of the diisocyanate. The molar ratio of monoisocyanate to diisocyanate may vary between from about 0.01:3 to about 4:1, however, a ratio of from about 0.2:1 to about 2:1 is preferred.

In accordance with the invention, the trimerization process may be carried out at any suitable temperature by the addition of a suitable catalyst. This polymerization process will occur at room temperature, however, it is preferred to heat the reaction mixture to a temperature of at least about 50° C. in order to accelerate the reaction.

In accordance with the invention, it is preferred that the organic compound having at least two isocyanate groups have a molecular weight of at least about 400. However, any suitable diisocyanate may be used in the practice of this invention. Throughout the specification and claims, the term "diisocyanate" is meant to include not only monomeric diisocyanates, but any organic compound such as, for example, the reaction product of an excess of an organic diisocyanate with an organic compound containing active hydrogen containing groups in the molecule, the active hydrogen containing groups being reactive with isocyanate groups. These compounds may be obtained by reacting an excess of an organic polyisocyanate with any suitable compound containing active hydrogen containing groups which are reactive with isocyanate groups. The ratio of the isocyanate groups to the active hydrogen containing groups is from about 1.2:1 to about 3.0:1 depending upon the molecular weight of the reaction product desired.

By the term "compound containing active hydrogen containing groups" is meant any compound which gives a positive Zerewitinoff test. In other words, any chemical which when added to a Grignard solution of methyl iodide, will liberate methane by decomposition of the Grignard reagent.

In order to prepare a diisocyanate having a molecular weight of at least about 400, any suitable compound containing active hydrogen containing groups which are reactive with isocyanate groups may be used in the reaction with an organic diisocyanate such as, for example, hydroxyl polyesters, polyhydric polyalkylene ethers, polyhydric polyalkylene thioethers, polyester amides, polyacetals, and organic compounds containing activated methylene groups.

Any suitable hydroxyl polyester may be used in the reaction with a monomeric diisocyanate such as, for example, the reaction product of a polycarboxylic acid and a polyhydric alcohol. Any suitable polycarboxylic acid may be used such as, for example, succinic, oxalic, adipic, methyladipic, sebacic, glutaric, pimelic, azelaic, suberic; aromatic carboxylic acids including phthalic, terephthalic isophthalic, 1,2,4-benzene tricarboxylic; sulfur containing acids such as thiodiglycolic, thiodipropionic; unsaturated acids such as maleic, fumaric, itaconic and citraconic or mixtures thereof. Any suitable polyhydric alcohol may be used such as, for example, ethylene glycol, propylene glycol, butylene glycol, 1,6-hexane diol, trimethylol propane, pentaerythritol and the like.

Any suitable polyester amide may be used in the reaction with a monomeric diisocyanate such as, for example, the reaction product of an amine and/or amino alcohol with a polycarboxylic acid. Any suitable amine such as, for example, ethylene diamine, propylene diamine and the like may be used. Any suitable amino alcohol such as, for example, beta-hydroxyethylamine and the like may be used. Any suitable polycarboxylic acid may be used, such as, for example those more particularly disclosed above for the preparation of the hydroxyl polyesters.

Any suitable polyhydric polyalkylene ether may be used to prepare a high molecular weight diisocyanate by reaction with a monomeric diisocyanate such as, for example, the condensation product of an alkylene oxide with a small amount of compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may be used such as, for example, ethylene oxide, propylene oxide, butylene oxide, amylene oxide or mixtures thereof. The polyhydric polyalkylene ethers may be prepared by any known process such as, for example, the process described by Wurtz in 1859 and in "Encyclopedia of Chemical Technology," volume I, pages 257 to 262, published by Interscience Publishers, Inc., 1951, or in U.S. Patent 1,922,459.

Any suitable polyhydric polyalkylene thioether may be used in the reaction with a monomeric diisoycanate such as, for example, the reaction product of one of the aforementioned alkylene oxides used in the preparation of the polyhydric polyalkylene ethers with a polyhydric thioether such as, for example, thiodiglycol, 3,3'-dihydroxypropyl sulfide, 4,4'-dihydroxy butyl sulfide, 1,4-(beta hydroxy ethyl) phenylene dithioether and the like.

Any suitable polyacetal may be used in the reaction with a monomeric diisocyanate such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above in the preparation of the hydroxyl polyesters may be used.

Any suitable organic compound containing activated methylene groups may be reacted with a polyisocyanate to obtain the organic compound having at least two isocyanate groups such as, for example compounds containing enolizable hydrogen atoms such as, for example, aceto acetic ester, diethyl malonate, methyl-m-butyl malonate, acetyl acetone, acetonyl acetone and the like.

In the preparation of the organic compound having a molecular weight of at least about 400 and at least two isocyanate groups, any suitable polyisocyanate may be used in the reaction with any of the above-mentioned compounds containing active hydrogen containing groups such as, for example ethylene diisocyanate, ethylidene diisocyanate, propylene-1,2-diisocyanate, butylene-1,3-diisocyanate, cyclohexylene-1,2-diisocyanate, 2,4-toluylene diisocyanate, 2,6-toluylene diisocyanate, 4,4'-diphenyl methane diisocyanate, paraphenylene diisocyanate, metaphenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexylmethane-4,4'-diisocyanate, tetramethylene diisocyanate, pentamethylene diisocyanate, hexamethylene diisocyanate, 1-chlorobenzene-2,4-diisocyanate, furfurylidene diisocyanate, and the like.

The organic compound having a molecular weight of at least about 400 and containing at least two terminal isocyanate groups may also be prepared by copolymerizing an unsaturated isocyanate such as, for example, 2,3-butenyl-1,4-diisocyanate or allyl isocyanate with another unsaturated product such as, for example, unsaturated polyesters which may be prepared by reacting any of the polyhydric alcohols mentioned above with respect to the preparation of suitable hydroxyl polyesters with an unsaturated difunctional carboxylic acid such as, for example, maleic acid, fumaric acid, itaconic acid, citraconic acid and the like. The unsaturated isocyanate can then be copolymerized through the double bonds to obtain the organic compound having a molecular weight over 400 and having terminal isocyanate groups.

To obtain an elastomeric product in accordance with this invention, the products mentioned above are trimerized with a monoisocyanate such as, for example, alkyl monoisocyanates including methyl isocyanate, ethyl isocyanate, propyl isocyanate, butyl isocyanate, amyl isocyanate, and the like; aryl isocyanates including phenyl isocyanate, naphthyl isocyanate, xenyl isocyanate; alkaryl isocyanates including tolyl isocyanate, dimethyl phenyl isocyanate, methyl diphenyl isocyanate, ethyl phenyl isocyanate, propyl phenyl isocyanate and the like; aralkyl isocyanates including benzyl isocyanate, xylyl isocyanate, mesityl isocyanate, phenyl ethylene isocyanate and the like; cycloaliphatic isocyanates including cyclobutyl isocyanate, cyclobutenyl isocyanate, cyclopentyl isocyanate, cyclopentenyl isocyanate, cyclopentadienyl isocyanate, cyclohexyl isocyanate, cyclohexenyl isocyanate, cyclohexadienyl isocyanate and the like; heterocyclic isocyanates including tetrahydrofurfuryl isocyanate and the like. The monoisocyanates useful in this invention also include the reaction product of a diisocyanate with an organic compound containing one active hydrogen group which is capable of reacting with an —NCO group such as, for example, monohydric alcohols, phenols, primary and secondary monoamines. Any suitable diisocyanate such as those mentioned above may be used.

The novel plastics containing isocyanurate linkages provided by the method of this invention are useful for a wide variety of purposes because of the wide variety of physical properties obtainable. For instance, plastics suitable for use as substitutes for certain rubber articles are obtained by trimerizing two mols of the organic compound having a molecular weight of at least about 400 and preferably a molecular weight of greater than about 1000 and having terminal isocyanate groups with one mol of a monoisocyanate as listed above. By the procedure elastomeric materials are formed, which are suitable for use in the manufacture of casting and potting compounds, o-rings, molded diaphragms, bellows, valve seals, check valve buttons and the like. A particularly suitable use of the plastic compositions of this invention is in vibration damping devices such as, for example, motor mounts.

As stated previously, the trimerization procedure is carried out in the presence of a catalyst. The amount of catalyst may vary between from about .01 percent to about 10 percent based on the total weight of the polymerizable isocyanates. Catalysts suitable for use in the invention include N-methyl-N'-(dimethyl amino ethyl) piperazine, permethylated diethyl amino propyl amine, permethylated ethoxy propyl amine, permethylated methoxy propyl amine, permethylated diethylene triamine, the reaction product of diethylethanolamine and phenyl isocyanate, alkali salts of phenols, calcium acetate, sodium acetate, potassium benzoate and the like.

The invention will be further illustrated by the following examples, the parts being by weight unless otherwise specified.

EXAMPLE 1

To 100 parts of a polypropylene ether glycol having a molecular weight of about 2000 and an hydroxyl number of about 56 are added, about 0.3 part of propylene oxide and about .03 part of benzoyl chloride and the mixture stirred for about one half hour. About 17.4 parts of an isomeric mixture of 80 percent toluylene-2,4-diisocyanate and 20 percent toluylene-2,6-diisocyanate are added. The reaction mixture initially contains an —NCO/OH ratio of 2:1 and is stirred for about 2 hours with forced cooling. The mixture is then heated to from about 90° C. to about 95° C. and held at this temperature for an additional 2 hours. A polymer is obtained having a molecular weight of about 2350 and an —NCO content of about 3.5%. Thereafter, the polymer is treated with an additional 8.7 parts of toluylene diisocyanate mixture specified above to obtain an —NCO content of about 7 percent. About 100 parts of the admixture are placed in a clean dry vessel and deaerated at about 115° C. and one millimeter of pressure for about 30 minutes. About 3 parts phenyl isocyanate and about 1 part of 1-methyl-4-dimethyl-amino-ethyl piperazine are added and the mixture deaerated for 10 minutes at about 115° C. and one millimeter of pressure and thereafter cured for about 16 hours at about 80° C. An elastomeric plastic containing isocyanurate linkages is obtained having a Shore A hardness of about 65 and a melting point of about 285° C.

A product formed without the addition of the monoisocyanate in accordance with this invention forms a highly cross-linked plastic having a Shore A hardness of about 73 and a melting point much higher than that made in accordance with the invention. The product of Example 1 further exhibits improved tear strength over a comparision product made without the addition of monoisocyanate.

EXAMPLE 2

About 6 parts of phenyl isocyanate are substituted for the 3 parts of phenyl isocyanate of Example 1 and the procedure carried out in accordance with Example 1. The product obtained is an elastomeric plastic containing isocyanurate linkages having a Shore A hardness of about 56 and a melting point of about 245° C.

EXAMPLE 3

About 12 parts of phenyl isocyanate are substituted for three parts of phenyl isocyanate and the procedure carried out in accordance with Example 1. The product obtained is an elastomeric plastic containing isocyanurate linkages and having a Shore A hardness of about 35 and a melting point of about 220° C.

EXAMPLE 4

About 7.5 parts of octadecyl isocyanate are substituted for the 3 parts of phenyl isocyanate of Example 1 and in accordance with the procedure of Example 1. The resulting product is an elastomeric plastic containing isocyanurate linkages and having a Shore A hardness of about 68.

EXAMPLE 5

To about 100 parts of a polyproplene ether glycol having a molecular weight of about 2000 and an hydroxyl number of about 56 are added about 0.3 part of propylene oxide and about 0.3 part of benzoyl chloride and the mixture stirred for about ½ hour. About 10.4 parts of isomeric mixture of 80% toluylene-2,4-diisocyanate and 20% toluylene-2,6-diisocyanate are added. The reaction mixture has an NCO/OH ratio of 1.2:1, and is stirred for about 2 hours with forced cooling. The mixture is then heated to from about 70° C. to about 95° C. and held at this temperature for an additional 2 hours. A polymer is obtained having a molecular weight of about 6000 and a free —NCO content of about 1.3%. About 100 parts of the polymer is placed in a clean dry vessel and deaerated at about 115° C. and 1 millimeter of pressure for about 30 minutes. About 2 parts of phenyl isocyanate and 1 part of 1-methyl-4-dimethyl-amino ethyl piperazine are added and the mixture deaerated for 10 minutes at about 115° C. and 1 millimeter of pressure and thereafter cured for about 16 hours at 80° C. A soft rubbery product containing isocyanurate linkages and having a Shore A hardness of about 4 and a melting point of about 215° C. is obtained. The product shows exceptionally good adhesion to glass.

EXAMPLE 6

A substantially linear polyhydroxy terminated polyester having a molecular weight of about 2500 is obtained by the thermal condensation of 1.00 mol of adipic acid and 1.05 mols of ethylene glycol. To about 100 parts of the polyester are added about 14 parts of an isomeric mixture of 80% toluylene-2,4-diisocyanate and 20% toluylene-2,6-diisocyanate. The reaction mixture is maintained at a temperature of 80° C. for about 4 hours. A polymer is obtained having a molecular weight of about 2850 and a free —NCO content of 3.9%.

About 100 parts of the polymer is placed in a dry vessel and deaerated at about 115° C. and 1 millimeter of pressure for about 30 minutes. About 4.7 parts of phenyl isocyanate and 1 part of 1-methyl-4-dimethyl-amino ethyl piperazine are added and the mixture deaerated for about 10 minutes and about 115° C. and one millimeter of pressure and thereafter cured for about 16 hours at about 80° C. A rubbery elastomeric plastic containing isocyanurate linkages is obtained having a Shore A hardness of about 30 and exhibiting exceptionally good tear strength.

As a comparison product the procedure of Example 6 is followed with the exception that no monoisocyanate is added and the polymer prepared in the first part of the example is permitted to trimerize by itself. A hard highly cross-linked product is obtained having a Shore A hardness of about 60 and exhibiting a very poor tear strength.

EXAMPLE 7

The procedure set forth in Example 6 is followed with the exception that 7.0 parts of phenyl isocyanate are substituted for the 4.7 parts of phenyl isocyanate as in Example 6. The product obtained has a Shore A hardness of about 28 and exhibited rubbery-like qualities and good tear strength.

EXAMPLE 8

The procedure set forth in Example 6 is followed with the exception that 9.4 parts of phenyl isocyanate are substituted for the 4.7 parts of phenyl isocyanate as in Example 6. This product has a Shore A hardness of about 12, but the tear strength is not as good as that of the products of Examples 6 and 7. It is believed that the larger quantity of the monoisocyanate causes chain termination and therefore the different properties of the resulting product.

The products of this invention are very useful because of the properties obtained. The isocyanurate linkages provide stable products which are resistant to heat. The polymerization products may be made directly into tough, resilient elastomeric products or they can be utilized as intermediates in the preparation of other products.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method of preparing isocyanurate compositions which comprises admixing under trimerization conditions in the presence of a trimerization catalyst (a) an organic diisocyanate having a molecular weight of at least about 400 the addition product of an excess of monomeric organic diisocyanate and an organic compound containing active hydrogen containing groups, said groups being reactive with isocyanate groups, said organic compound being selected from the group consisting of dihydroxyl polyesters prepared by the process which comprises reacting dihydric alcohols and dicarboxylic acids, dihydroxyl polyester amides, dihydric polyalkylene ethers, dihydric polyalkylene thioethers and dihydric polyacetals and (b) an organic monoisocyanate, the molar ratio of said monoisocyanate to said diisocyanate being from about 0.2:1 to about 2:1.

2. An elastomeric composition prepared by a process which comprises mixing a diisocyanato terminated prepolymer prepared by a process which comprises reacting an excess of a mixture of 80% 2,4- and 20% 2,6-toluylene diisocyanate with a polypropylene ether glycol having a molecular weight of about 2000 with an organic monoisocyanate, the ratio of the latter to the former being from about 0.2:1 to about 2:1 and heating said mixture in the presence of N-methyl-N'-(dimethyl amino ethyl)-piperizine.

3. The elastomeric composition of claim 2 wherein said organic monoisocyanate is phenyl isocyanate.

References Cited by the Examiner

UNITED STATES PATENTS

| | | | |
|---|---|---|---|
| 2,954,365 | 9/1960 | Windemuth et al. | 260—77.5 |
| 2,977,360 | 3/1961 | Dixon | 260—77.5 |
| 2,978,449 | 4/1961 | France | 260—77.5 |
| 2,979,485 | 4/1961 | Burkus | 260—77.5 |
| 3,115,479 | 12/1963 | Windemuth et al. | 260—77.5 |
| 3,143,517 | 8/1964 | Heiss | 260—18 |

LEON J. BERCOVITZ, *Primary Examiner.*

M. C. JACOBS, *Assistant Examiner.*